# United States Patent Office 3,586,727
Patented June 22, 1971

3,586,727
PROCESS FOR THE MANUFACTURE OF SUBSTITUTED 8, 10, AND 12-MEMBER RINGS BY THE CATALYTIC COOLIGOMERIZATION OF UNSATURATED COMPOUNDS
Günther Wilke and Paul Heimbach, Mulheim (Ruhr), Germany, assignors to Studiengesellschaft Kohle m.b.H., Mulheim (Ruhr), Germany
No Drawing. Continuation-in-part of applications Ser. No. 76,520, Dec. 19, 1960, Ser. No. 203,753, June 20, 1962, Ser. No. 532,900, Mar. 9, 1966, and Ser. No. 582,775, Sept. 27, 1966. This application July 18, 1969, Ser. No. 843,220
Int. Cl. C07c 3/10
U.S. Cl. 260—666                    7 Claims

ABSTRACT OF THE DISCLOSURE

Process of cyclocooligomerization of two different conjugated dienes to produce alicyclic products having at least 8 carbon atoms in the ring, at least two locations of olefinic unsaturation in the ring, and at least one substituent pendent from the ring, which process cyclocooligomerizes the two different conjugated dienes in contact with a carbonyl-free, zero valent nickel compound catalyst. Many of the new products thus formed by this process are described, characterized, and claimed.

This application is a continuation-in-part of application Ser. No. 532,900, filed Mar. 9, 1966; application Ser. No. 76,520, filed Dec. 19, 1960, now abandoned; application Ser. No. 203,753, filed June 20, 1962, now abandoned; and application Ser. No. 582,775, filed Sept. 27, 1966.

In these parent applications, a process has been described for the catalytic dimerization and trimerization, respectively, of 1,3-diolefins, in which catalysts are used which are produced by mixing carbonyl-free compounds of nickel, with organometallic compounds such as metal alkyls, metal aryls, or Grignard compounds, or with metal hydrides or with metal hydride complex compounds and electron donors. The electron donors used are Lewis bases such as cyclic ethers, tertiary amines, especially cyclic tertiary amines, alkyl or aryl phosphines, especially triphenylphosphine, or alkyl or aryl phosphites or compounds with a carbon-to-carbon multiple bond. Similar processes are claimed in German Auslegeschrift 1,126,864 of Badische Anilin- und Sodafabrik, wherein the catalysts are made by the reduction of transitional metal compounds by means of metals (Al, Mg), and German Auslegeschrift 1,114,268, wherein certain nickel-(O) compounds are used as catalysts. Furthermore, it is known that butadiene can be transformed with the aid of catalysts, such as $(R_3P)_2Ni(CO)_2$, into mixtures of cyclooctadiene-(1,5) and 4-vinylcyclohexene by the methods described in German Pat. 881,511, and in U.S. Pat. 2,686,209.

According to Austrian Pat. 232,495, the catalytic cooligomerization of butadiene and ethylene, for example, results in the formation of cyclodecadiene-(1,5) compounds. According to all the processes described in the above-cited patents, substituted 1,3-diolefins can be used instead of butadiene-(1,3).

In the general further development of cyclooligomerization, it has surprisingly been found that substituted 8-member, 10-member, 12-member, and larger rings can also be manufactured. One aspect of this invention is the catalytic cyclocooligomerization of different conjugated diolefins in the presence of a known catalyst to produce substituted, unsaturated, alicyclic compounds.

Substituted 12-member rings are obtained, for example, by the simultaneous reaction of butadiene and isoprene in the presence of carbonyl-free catalysts of zero valent nickel. 1-methyl-cyclododecatriene-(1,5,9) is formed to a major extent, along with a little dimethyl-cyclododecatriene-(1,5,9), and some cyclododecatriene-(1,5,9).

If butadiene is introduced into a solution of catalyst— nickel-(O): tri-(o-phenylphenyl)-phosphite=1:1 in isoprene; a substituted ring compound [1-methyl-cyclooctadiene-(1,5)] forms in yields close to 90 percent of the reacted isoprene.

According to the invention, many different substituted 8, 10, and 12-member rings can be produced by cyclocooligomerization, according to the following reaction diagrams:

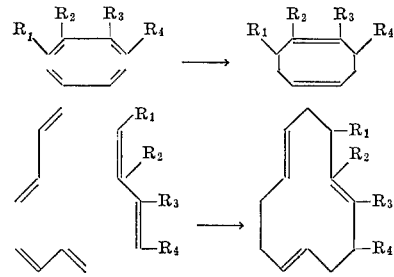

$R_1$, $R_2$, $R_3$, $R_4$=H or aryl, alkyl or alkoxy radicals; in all of the above formulae at least one R is not hydrogen.

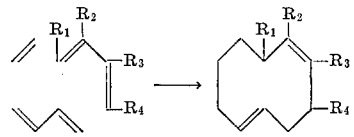

$R_1$, $R_2$, $R_3$, $R_4$=H or aryl, alkyl or alkoxy radicals; in all of the above formulae at least 1 R is not hydrogen.

According to the invention, another type of cyclocooligomerization of 1,3-diolefins can be achieved, namely, the cyclocooligomerization of 1-disubstituted conjugated dienes with 2- or 2,3-disubstituted conjugated dienes.

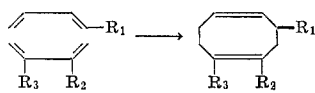

$R_1$, $R_2$, and $R_3$=aryl or alkyl, or $R_2$ and $R_3$=H.

The selective cyclocooligomerization of this invention can be performed according to all the above-mentioned processes with the aid of catalysts of zerovalent nickel such as those described in German Auslegeschrift 1,140,-569, and in Austrian Pat. 232,495. These catalysts are especially well suited to use in the cyclocooligomerization of this invention since with these catalysts isomerization of the types which have been observed to a certain extent in the case, for example, of catalysts prepared by means of alkali metals according to German Auslegeschift 1,126,-864, does not occur. The carbonyl-free, zerovalent nickel catalysts used in this invention have the additional advantage in the cyclocooligomerization process hereof in that they are catalytically active at lower temperatures than, for example, the catalysts which are prepared according to German Auslegeschift 1,144,268. The complex compounds of zerovalent nickel described in German Auslegeschrift 1,191,375 can also be used as catalysts. In all cases in which substituted conjugated diene materials are used, the substituents themselves can be hydocarbons or functional groups (e.g., alkoxy or carboxylic acid ester groups). They may also be hydrocarbons which contain such functional groups. The only functional groups involved are those which do not enter into any reactions with the catalysts, with the conjugated diene reactants, or with the unsaturated alicyclic products under the cyclooligomerization reaction conditions.

The process according to the invention can be performed in the presence of inert solvents, but only those which attack neither reactants, nor products, nor the catalysts, nor the organometallic components, nor the metal hydrides which were used for the manufacture of the catalyst. Preferably, aliphatic or aromatic hydrocarbons, or aliphatic or cycloaliphatic ethers are used. It is particularly advantageous, however, to cause the starting conjugated diolefins or the products that can be made according to the process as solvents in the manufacture of the catalyst, so that no foreign substances will have to be separated from the reaction product. The process can be performed at normal pressure or at elevated pressure. The pressure range in that case is determined by the desired direction of the reaction and by the temperature that is needed in each case. The process can be performed at temperatures from −10 to 200° C., but preferably at 20 to 120° C.

Substituted 8, 10, and 12-member rings can be produced by the process of the invention in high yields with reference to the substituted butadiene-(1,3) reactant. The compounds that can be manufactured according to the invention are valuable starting products for further syntheses. For example, 1-substituted and 1,2-disubstituted cyclooctadienes and cyclododecatrienes, as well as 4,5-dimethyl-cyclodecatrienes-(1,4,7) can easily be partially hydrogenated to form the corresponding 1-disubstituted and 1,2-disubstituted cylclomonoolefins, respectively.

In addition to the cyclooligomerization of two different conjugated dienes, such as butadiene and isoprene, according to this invention, another aspect of this invention resides in the cyclocooligomerization of two different conjugated dienes and an additional unsaturated copolymerizable monomer or monomers which additional monomer or monomers are acetylenically or olefinically unsaturated but are not themselves conjugated dienes. Thus, according to this aspect of this invention, two or more different conjugated dienes, preferably two, are cyclocooligomerized under the same reaction conditions and catalyst as set forth above, with a monoolefinic or acetylenic comonomer to form a substituted alicyclic compound having at least 10 carbon atoms and at least two locations of unsaturation in the ring, and at least one substituent pendent from the ring.

The additional (third) monomer may be one or more of the following types of compounds: acetylene, substituted acetylene, e.g., butine-1, ethylene, styrene, acrylonitrile, acrylic acid esters, and the like. The cyclocooligomerization, in this aspect of this invention the portion of the additional monomer pendent from the unsaturation thereing, will form an additional pendent substituent on the alicyclic product. Thus, if butadiene, isoprene and propylene, for example, were cyclocooligomerized according to this invention, an alicyclic product having at least 10 carbon atoms in the ring and at least two methyl groups pendent from the ring would result.

It is within the scope of this invention to utilize acyclic or cyclic unsaturated reactants of the mono-unsaturated or conjugated diene type.

Through the cooligomerization of cyclic acetylenes with butadiene, 4,5- polymethylene-cyclodecatrienes - (1,4,7) can be produced in yields of more than 95 percent of the reacted cycloalkine:

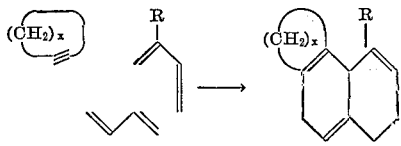

The substances that can be manufactured according to the invention on the basis of the above formulation can be partially hydrogenated.

The compounds occurring as by-products, such as cyclooctadiene-(1,5), cyclodecadiene-(1,5), and cyclododecatriene-(1,5,9), are valuable starting substances for prior-art technical processes.

The substituted 8-, 10- and 12-membered alicyclic rings, whether or not unsaturated, can be used as solvents.

Further, these unsaturated ring compounds can be oxidatively cleaved to produce long-chain acids, aldehydes and alcohols which have known utility in the plasticizer and detergent arts.

According to this invention, the two different conjugated diene reactants are suitably cyclocooligomerized in substantially any molar ratio with respect to each other. In considering these ratios, it should be understood that it is not intended to be within the scope of this invention to cyclooligomerize one (1) conjugated diene having small or trace impurity concentrations of another conjugated diene admixed therewith. It is considered that mole ratios of about 10:1 to 1:10 of two different conjugated dienes, or ratios of more than two conjugated dienes to each other where no one such diene is less than about 10 mole percent of the diene reactant mixture, defines the embrace of this invention. It is preferred that the conjugated dienes be used in about equimolar proportions with respect to each other, at least with respect to reacting (converted) proportions. Thus, it is considered desirable to form alicyclic products having 8 carbon atoms in the ring. Products having 12 carbon atoms in the ring result from a converted reactant mole ratio of 2:1, and 16 carbon atom ring products have a converted reactant mole ratio of 2:2 or 1:3, depending upon the specific product.

The additional reactant, where used, should be added to the reactant mixture in proportions of more than 6 mole percent, preferably up to equimolar proportions with respect to each of the conjugated diene reactants.

This cyclocooligomerization reaction can be carried out batchwise or continuously. Continuous operation without back-mixing is preferred.

This invention will be illustrated by reference to the following non-limiting examples:

EXAMPLE 1

4.34 g.=17.05 mmoles of nickel acetyl acetonate and 9.19 g.=17.05 mmoles of tri-(o-phenylphenyl)-phosphite are reduced in 85 cc. of benzene in which about 10 g. of butadiene are dissolved, with 4.43 g.=34.1 mmoles of monoethoxydiethyl aluminum, at 0 to 20° C. In two hours approximately 250 g. of butadiene per hour (total 680 g.) are introduced into the catalyst solution at 60° C. over a period of about two hours and forty minutes, with the simultaneous drop-by-drop addition of about 60 g. of isoprene per hour (total 165 g.). The reaction is interrupted, and distillation is performed directly from the reaction vessel at $10^{-4}$ torr and a bath temperature of no more than 100° C. 766 g. of product are obtained, having the following compositions:

15.5 g.=2.0% 4-vinylcyclohexene
4.3 g.=0.6% mono-substituted 4-vinylcyclohexene
5.2 g.=0.7% p-diprene
610.0 g.=79.7% cyclooctadiene-(1,5)
119.5 g.=15.6% 1-methylcyclooctadiene-(1,5)
7.4 g.=0.9% dimethylcyclooctadiene-(1,5)
1.1 g.=0.1% cyclododecatriene-(1,5,9)
1.8 g.=0.2% 1-methylcyclododecatriene-(1,5,9)
0.7 g.=0.1% dimethylcyclododecatriene-(1,5,9)
0.4 g.=0.1% trimethylcyclododecatriene-(1,5,9)

The yield of 1-methylcyclooctadiene-(1,5) amounts to 82 percent of the theory with reference to reacted isoprene (approximately 50 percent transformation).

The 1-methylcyclooctadiene-(1,5) (B.P.$_{14}$=59.5° C., $n_D^{20}$=1.49.10), which has not been described hitherto, was characterized by infrared, $H^1$ nuclear magnetic resonance [NMR] and mass spectrometry. At normal pressure and 20° C., it can easily be partially hydrogenated to 1-methylcyclooctene using Raney nickel as the catalyst, with the absorption of 1 mole of $H_2$. Oxidative cleavage produces 8-ketononane-aldehyde.

EXAMPLE 2

The same catalyst was manufactured as described above, but in isoprene instead of benzene. For a period of 28 hours, at a reaction temperature that is slowly increased from 30° C. to 52° C., approximately 20 g. of butadiene per hour are introduced (total about 600 g. butadiene). After distillation as in Example 1, 686 g. of a product is obtained having the following composition:

11.2 g.=1.6% 4-vinylcyclohexene
8.2 g.=1.2% mono-substituted 4-vinylcyclohexene
4.5 g.=0.7% p-deprene
517.0 g.=75.3% cyclooctadiene-(1,5)
125.7 g.=18.3% 1-methylcyclooctadiene-(1,5)
3.7 g.=0.5% dimethylcyclooctadiene-(1,5)
1.5 g.=0.2% cyclododecatriene-(1,5,9)
1.5 g.=0.2% 1-methylcyclododecatriene-(1,5,9)
13.0 g.=1.9% higher oligomers The yield of 1-methylcyclooctadiene-(1,5), with reference to reacted isoprene (approximately 21 percent transformation), amounts to about 84 percent of the theory.

EXAMPLE 3

Catalyst (twice the amount) and procedure as in Example 1. Instead of the phosphite, however, the corresponding amount (4.45 g.) of triphenylphosphine is used. At a temperature of 60° C. approximately 30 g. of butadiene per hour (total 250 g.) are introduced into the catalyst solution and at the same time 25 g. of isoprene (per hour) is added in drop-by-drop fashion. After distillation as in Example 1, 362 g. of product are obtained having the following composition:

61.6 g.=17.0% 4-vinylcyclohexene
19.5 g.=5.4% mono-substituted 4-vinylcyclohexene
15.9 g.=4.5% p-diprene
124.8 g.=34.6% cyclooctadiene-(1,5)
74.0 g.=20.5% 1-methylcyclooctadiene-(1,5)
17.5 g.=4.8% dimethylcyclooctadiene-(1,5)
2.1 g.=0.6% (?)
7.7 g.=2.2% cyclododecatriene-(1,5,9)
15.4 g.=4.2% 1-methylcyclododecatriene-(1,5,9)
6.2 g.=1.7% dimethylcyclododecatriene-(1,5,9)
5.6 g.=1.6% (?)
4.1 g.=1.2% trimethylcyclododecatriene-(1,5,9)
6.9 g.=1.9% higher oligomers The yield of 1-methylcyclooctadiene-(1,5), with reference to the reacted isoprene (37 percent transformation) amounts to 40 percent of the theory.

EXAMPLE 4

The catalyst (1.5 times the amount as in Example 1) is prepared in approximately one liter of piperylene (740 g.). For 28 hours, approximately 45 g. of butadiene per hour (total 1280 g.) are introduced into this solution at a temperature of initially 44° C. and after six hours finally at 50° C. After distillation as in Example 1, 1,642 g. of product is obtained having the following composition:

22.9 g.=1.4% 4-vinylcyclohexene
5.1 g.=0.3% mono-substituted 4-vinylcyclohexene
3.8 g.=0.2% disubstituted 4-vinylcyclohexene
970.0 g.=59.1% cyclooctadiene-(1,5)
592.0 g.=36.9% 3-methylcyclooctadiene-(1,5)
44.0 g.=2.6% dimethylcyclooctadiene-(1,5)
4.4 g.=0.3% higher oligomers The yield of 3-methylcyclooctadiene-(1,5), with reference to the reacted piperylene (51 percent transformation), amounts to 86.4 percent of the theory.

EXAMPLE 5

Catalyst and procedure as in Example 1.
52 g. of 2-phenyl-butadiene are placed in the reaction vessel and 50 g. of butadiene per hour are introduced for six hours at 80° C. After distillation, 342.4 g. of product are obtained having the following composition.

9.5 g.=2.8% 4-vinylcyclohexene
280.3 g.=81.9% cyclooctadiene-(1,5)
7.2 g.=2.1% mono-substituted 4-vinylcyclohexene
42.2 g.=12.3% 1-phenylcyclooctadiene-(1,5)
3.2 g=0.9% higher oligomers The yield of 1-phenylcyclooctadiene-(1,5), with reference to the reacted 2-phenyl-butadiene (transformation 64 percent), amounts to 81 percent of the theory.

The 1-phenylcyclooctadiene-(1,5) (B.P.$_{.14}$=155° C.; $n_D^{20}$ 1.5764) can be hydrogenated catalytically in part to phenyl-cyclooctane (B.P.$_{.14}$=149° C; $n_D^{20}$ 1.5319).

EXAMPLE 6

Catalyst and procedure as in Example 1.
60.1 g. of 1-methoxy-butadiene are heated to 60° C. together with the catalyst solution and for twenty hours approximately 30 g. of butadiene per hour (total 620 g.) are introduced. 661 g. of a product are obtained having the following composition:

16.6 g.=2.5% 4-vinylcyclohexene
571.0 g.=86.3% cyclooctadiene-(1,5)
1.6 g.=0.2% mono-substituted 4-vinylcyclohexenene
68.6 g.=10.4% 3-methoxycyclooctadiene-(1,5)
3.0 g.=0.5% higher oligomers The yield of 3-methoxycyclooctadiene-(1,5), with reference to the reacted 1-methoxy-butadiene (transformation 85 percent), amounts to 94 percent of the theory. This 3-methoxycyclooctadiene-(1,5)

(B.P.$_{.20}$:86° C., $n_D^{20}$:1.4887)

can easily be hydrogenated catalytically with the absorption of 2 moles of $H_2$ to form the likewise previously undescribed methylcyclooctyl ether (B.P.$_{.20}$:75 to 76° C., $n_D^{20}$:1.4578). Both compounds were characterized by their infrared, $H^1$ NMR and mass spectre.

EXAMPLE 7

Catalyst (1,5 times the amount) and procedure as in Example 1. The catalyst solution is mixed with 122 g. of 5-methyl-heptatriene-(1,3,6). At 60° C., approximately 10 g. of butadiene per hour were introduced for 28 hours (total about 290 g.). 353 g. are obtained of a product having the following composition:

6.0 g.=1.7% 4-vinylcyclohexene
238.0 g.=67.5% cyclooctadiene-(1,5)
3.3 g.=1.2% mono-substituted 4-vinylcyclohexene
105.2 g.=29.8% 3-(butene-(1)-yl-(3)-cyclooctadiene-

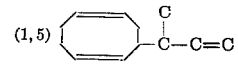

The yield of substituted butadiene, with reference to the reacted 5-methyl-heptatriene (60 percent transformation) amounts to 96.3 percent of the theory.

The 3-(butadiene-[1]-yl-[3]-cyclooctadiene-(1,5) is not isolated as such, since, when it is greatly heated, it is inclined to enter Cope's transposition as 1,5-diene. The catalytic hydrogenation produces sec-butyl-cyclooctane (B.P.$_{.21}$:111.5° C., $n_D^{20}$:1.4648) with the absorption of 3 moles of $H_2$.

The hydrocarbon was characterized on the basis of its $H^1$ NMR and mass spectra.

EXAMPLE 8

Catalyst and procedure as in Example 1.
77.2 g. of 2,3-dimethyl-butadiene are heated to 60° C. together with the catalyst. For sixteen hours, approximately 30 grams of butadiene per hour (total 460 g.) is introduced, and 494.5 g. of product is obtained having the following composition:

11.9 g.=2.4% 4-vinylcyclohexene
425.0 g.=85.9% cyclooctadiene-(1,5)
50.4 g.=10.2% 1,2-dimethyl-cyclooctadiene-(1,5)
4.2 g.=0.8% disubstituted 4-vinylcyclohexene
3.0 g.=0.6% higher oligomers The yield of 1,2-dimethyl-cyclooctadiene-(1,5), with reference to the reacted 2,3-dimethyl-butadiene (45 percent transformation), amounts to 93 percent of the theory.

The 1,2-dimethyl-cyclooctadiene-(1,5) (B.P.$_{18}$:78.5° C., $n_D^{20}$:1.4941), which has not been described hitherto, can easily be hydrogenated, with Raney nickel as the catalyst, partially to 1,2-dimethyl-cyclooctene, from which n-decadione-(2,9) (M.P. 63 to 64° C.) is obtained by oxidative decomposition.

EXAMPLE 9

Catalyst and procedure as in Example 1.

232 g. of n-octatriene-(1,3,6) are heated with the catalyst solution to 80° C., with the introduction of butadiene. In 1.5 hours, approximately 400 g. of butadiene are adsorbed. 527 g. of product are obtained having the following composition:

8.7 g.=1.6% 4-vinylcyclohexene
326.9 g.=62.1% cyclooctadiene-(1,5)
11.3 g.=2.1% monosubstituted 4-vinylcyclohexene
178.8 g.=33.9% 3-(butene-[2]-yl-[1])-cyclooctadiene-

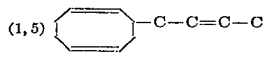

1.5 g.=0.3% higher oligomers

The yield of 3-substituted cyclooctadiene-(1,5), with reference to the reacted n-octatriene-(1,3,6) (transformation 55 percent), amounts to 93 percent of the theory.

Catalytic hydrogenation produces n-butyl-cyclooctane (B.P.$_{14}$:107° C., $n_D^{20}$:1,4609) with the absorption of 3 moles of H$_2$. The hydrocarbon was unequivocally characterized by its infrared and mass spectra.

EXAMPLE 10

The same catalyst as in Example 1 is reduced in a mixture of 340 g. of piperylene and 432 g. of isoprene with the addition of 17 g. of butadiene, and the reaction mixture is heated for 96 hours in an autoclave at 55 to 57° C. After distillation as in Example 1, 713 g. of product are obtained having the following composition:

50.7 g.=7.3% unknown substance
14.4 g.=2.1% 3-methylcyclooctadiene-(1,5)
15.0 g.=2.2% p-diprene
24.4 g.=3.5% 1-methylcyclooctadiene-(1,5)
22.5 g.=3.2% 6 unknown substance
70.2 g.=10.1% dimethylcyclooctadiene - (1,5) (from piperylene)
68.2 g.=9.7%  } 1,4- and 2,4-dimethyl cyclo-
236.0 g.=34.1% } octadiene-(1,5)
102.0 g.=14.7% dimethylcyclooctadiene-(1,5) (from isoprene)
86.3 g.=12.5% cyclic and open-chain trimers
3.5 g.=0.5% higher oligomers

EXAMPLE 11

4.34 g.=17.05 mmoles of nickel acetyl acetonate are reduced in 380 g. of piperylene with 4.43 g.=34.1 mmoles of ethoxy aluminum diethyl. The catalyst solution is aspirated into an autoclave, and then 50 g. of butadiene and 50 atmospheres of ethylene are forced in. Every two days another 50 g. of butadiene are forced in. The reaction mixture is allowed to stand for 16 days at 12 to 15° C. The excess ethylene and butadiene is blown off and then hydrogen is immediately forced in under pressure. After no more H$_2$ absorption is to be observed even at 60° C. and 100 atmospheres hydrogen pressure, the autoclave is cooled and the excess gas is blown off, and the entire reaction product is distilled. 449 g. of product are obtained, which, according to analysis by gas chromatography, has the following composition:

6.3 g.=1.4% ethylcyclohexane
5.4 g.=1.2% cyclooctane
9.4 g.=2.1% (?)
24.3 g.=5.4% n-decane
263.0 g.=58.5% cyclodecane
99.3 g.=22.1% methylcyclodecane
1.8 g.=0.4% dimethylcyclodecane
1.3 g.=0.3% ( )
21.6 g.=4.8% cyclododecane
16.6 g.=3.7% higher oligomers The yield of methylcyclodecane (B.P.$_{13}$:92° C.) with reference to reacted piperylene (16 percent) amounts to about 75 percent.

EXAMPLE 12

The catalyst is prepared as in Example 11, but instead of piperylene 300 g. of isoprene are used. The solution is aspirated into a 2-liter autoclave and mixed with 500 g. of butadiene. The reaction mixture stands for five days at room temperature. After hydrogenation as in Example 11, 251 g. of product are obtained, having the following composition:

1.5 g.=0.6% ethylcyclohexane
1.5 g.=0.6% (?)
k.5 g.=0.6% cyclooctane
23.4 g.=9.4% n-decane
8.0 g.=3.2% iso-undecane (methyldecane)
2.0 g.=0.8% dimethyl-n-decane
149.5 g.=60.0% cyclodecane
39.7 g.=15.9% methyl-cyclodecane
1.0 g.=0.4% (?)
15.7 g.=6.3% cyclododecane
2.0 g.=0.8% methyl-cyclododecane
3.5 g.=1.4% higher oligomers The yield of methyl-cyclododecane, with reference to the reacted isoprene (7 percent), amounts to about 72 percent of the theory.

EXAMPLE 13

The catalyst is prepared as in Example 1 and mixed with 400 g. of isoprene. 57 atmospheres of ethylene is forced onto the mixture in an autoclave, and then for twenty hours about 25 g. of butadiene per hour are injected. After cooling and blowing off to normal pressure, the reaction mixture is distilled as in Example 1. After hydrogenation under pressure with Raney nickel catalyst, 682 g. are obtained of a product having the following composition:

10.2 g.=1.5% ethylcyclohexane
5.5 g.=0.8%
8.2 g.=1.2% n-decane
281.0 g.=41.2% cyclooctane
4.1 g.=0.6% (?)
68.2 g.=10.0% methylcyclooctane
231.8 g.=34.0% cyclodecane
64.7 g.=9.5% methylcyclodecane
8.2 g.=1.2% higher oligomers The yield of methylcyclooctane and methylcyclodecane, with reference to the reacted isoprene (about 20 percent reacted), amounts to 91 percent of the theory.

EXAMPLE 14

18 g.=65.5 mmoles of Ni(cyclooctadiene-[1,5])$_2$ are mixed in an autoclave with 1082 g. of isoprene and 2000 g. of butadiene and are allowed to stand for two months at 60° C. After cooling, the catalyst in the reaction mixture is destroyed with 2 N HCl with the admission of air.

After distillation, 1383 g. are obtained of a product of the following composition:

5.5 g.=0.4% two unknown hydrocarbons
47.6 g.=3.3% 4-vinylcyclohexene
77.6 g.=5.6% p-diprene
35.8 g.=2.6% cyclooctadiene-(1,5)
2.5 g.=0.2% unknown hydrocarbons
27.7 g.=2.0% dipentene
558.9 g.=40.4% trans, trans, trans-cyclododecatriene-(1,5,9)
21.6 g.=1.6% trans, trans, cis-cyclododecatriene-(1,5,9)
21.8 g.=1.6% trans, cis, cis-cyclododecatriene-(1,5,9)
224.7 g.=16.2% 1-methyl-cyclododecatriene-(1,5,9) I
80.4 g.=5.8% 1-methyl-cyclododecatriene-(1,5,9) II
17.2 g.=1.2% dimethyl-cyclododecatriene-(1,5,9) I
7.3 g.=0.5% dimethyl-cyclododecatriene-(1,5,9) II
181.2 g.=13.1% higher oligomers A portion of this product is hydrogenated, and by means of preparative gas chromatography methylcyclodo-decane is isolated ($n_D^{20}$:1.4718). The hitherto undescribed 1-methylcyclododecatriene-(1,5,9) I boils at 14.5 torr at 118° C. ($n_D^{20}$ 1.5048). The 1-methyl-cyclododecatriene-(1,5,9) II was characterized only by hydrogenation to methylcyclododecane.

The yield of 1-methyl-cyclododecatriene-(1,5,9), with reference to reacted isoprene (27 percent reaction), amounts to 40 percent of the theory.

EXAMPLE 15

Catalyst and quantities of isoprene and butadiene as in Example 11.

The reaction mixture, however, is pumped through a reactor at 110° C. with a time of stay of about 60 minutes, the reactor consisting of a copper capillary with a capacity of two liters which is lying in a heating bath and at the extremity of which there is installed a relief valve adjusted 20 50 atmospheres. Total time 2.5 hours. The composition of the products is similar to Example 14, but 150 g. of product is formed per hour per gram of nickel in the catalyst.

The yield of 1-methyl - cyclododecatriene - (1,5,9) amounts to 47 percent of the reacted isoprene (35 percent reacted).

EXAMPLE 16

Catalyst and procedure as in Example 14, but 1.08 kg. of piperylene is used instead of isoprene. The reaction product obtained is agitated in air until it is virtually colorless. The nickel hydroxide that precipitates is separated by centrifugation and then distilled. 1514 g. are obtained of a product having the following composition:

119.2 g.=7.9% 4-vinylcyclohexene
5.4 g.=0.4% two unknown hydrocarbons
26.6 g.=5.7% cyclooctadiene-(1,5)
1.7 g.=0.1% 3-methyl-cyclooctadiene-(1,5)
73.7 g.=4.8% five unknown hydrocarbons
1057.3 g.=69.8% cyclododecatriene
130.0 g.=8.6% 3-methyl-cyclododecatriene-(1,5,9)
40.0 g.=2.6% higher oligomers.

The yield of 3-methyl-cyclododecatriene-(1,5,9), with reference to reacted piperylene (29 percent reacted) amounts to 53 percent of the theory.

In the distillation, a 3-methyl-cyclododecatriene-(1,5,9) is obtained (B.P.$_{10}$:105° C., $n_D^{20}$:1.4968, 92 percent pure) which still has a tcc-cyclododecatriene-(1,5,9)-content of 8 percent. Catalytic hydrogenation yields methylcyclododecane in addition to cyclododecane.

EXAMPLE 17

Catalyst as in Example 1. After the addition of 100 g. of 2-ethylbutadiene, the mixture is heated to 60° C. and for two hours approximately 250 g. of butadiene are introduced per hour. After distillation as in Example 1, the following is obtained:

8.8 g. 4-vinylcyclohexane
439.0 g. cyclooctadiene-(1,5)
3.9 g. ethyl-substituted 4-vinylcyclohexene
0.6 g. (?)
106.1 g. 1-ethyl-cyclooctadiene-(1,5)
3.6 g. diethyl-cyclooctadiene(1,5)
0.6 g. cyclododecatriene(1,5,9)
2.3 g. higher hydrocarbons 564.9 g. product The yield of 1-ethyl-cyclooctadiene-(1,5), with reference to reacted ethylbutadiene (approximately 70 percent reacted), amounts to 95 percent of the theory.

1-ethyl-cyclooctadiene-(1,5), which has not been described hitherto, (B.P.$_{16}$:76° C., $n_D^{20}$:1.4900), was characterized by infrared, $n^1$ NMR and mass spectroscopy.

EXAMPLE 18

Catalyst as in Example 1, but half the amount. At 80° C., butadiene is introduced into the catalyst solution and simultaneously 55 g. of sorbic acid ethyl ester is added drop by drop over a period of two hours. As the drop-by-drop addition is made, the catalyst turns deep red and the butadiene absorption becomes slower. In 15 hours approximately 320 g. of butadiene are reacted. After the usual distillation, the following is obtained:

7.5 g. =2.2% 4-vinylcyclohexene
293.0 g.=85.9% cyclooctadiene-(1,5)
3.9 g.=1.1% six-ring codimers of butadiene and sorbic acid ethyl ester
32.2 g.=9.4% 8-methyl-cyclooctadienyl-carboxylic acid ethyl ester [1]
4.7 g.=1.4% higher olefins The yield of [1] amounts to 85 percent of the reacted sorbic acid ethyl ester (amount reacted=50 percent).

The 8-methyl-cyclooctadienyl-(3)-carboxylic acid ethyl ester (B.P.$_{15}$:133°C., $n_D^{20}$:1.484), which has not been described previously, was characterized by infrared, $H^1$ NMR and mass spectra.

What is claimed is:

1. Process of producing alicyclic, unsaturated compounds containing a hydrocarbon ring of at least 8 carbon atoms and at least 2 locations of olefinic unsaturation, and at least one substituent pendant from said hydrocarbon ring, which comprises cyclocooligomerizing at least two different conjugated dienes in a reactant mole ratio of 1:10 to 10:1 in the presence of a carbonyl-free zerovalent nickel compound catalyst.

2. A process as claimed in claim 1, wherein said conjugated dienes are selected from the group consisting of butadiene, isoprene, piperylene, 2,3-dimethyl butadiene, 5-methyl-heptatriene-1,3,6, phenyl butadiene, methoxybutadiene, ethylbutadiene, n-octatriene-1,3,6, and sorbic acid ester.

3. A process as claimed in claim 1, carried out in a solvent at a temperature of about −10 to 200° C.

4. A process as claimed in claim 3, carried out at about 20 to 120° C.

5. A process as claimed in claim 1, wherein said zerovalent nickel compound is a π-bonded compound between zerovalent carbonyl-free nickel and at least one Lewis base electron donor.

6. A process as claimed in claim 1, wherein said cyclocooligomerization is carried out between said at least 2 different conjugated dienes and at least one additional unsaturated copolymerizable monomer.

7. A process as claimed in claim 6, wherein said additional monomer is at least one member selected from the group consisting of ethylene, propylene, styrene, decene, acetylene, butine, cyclohexene, bicyclo(2,2,1)- heptene-(2), cyclododecyne, cyclotetradecadiyne, and ethyl sorbate.

References Cited
UNITED STATES PATENTS

| | | | |
|---|---|---|---|
| 3,387,045 | 6/1968 | Zuech | 260—666A |
| 3,288,869 | 1/1966 | Schroeder | 260—666A |
| 3,349,138 | 10/1967 | Larson et al. | 260—666B |
| 3,187,062 | 6/1965 | Shechter | 260—666B |
| 3,219,714 | 11/1965 | Kutepow | 260—666B |
| 3,238,265 | 3/1966 | Mueller | 260—666B |
| 3,249,641 | 5/1966 | Storrs et al. | 200—666B |
| 3,270,071 | 8/1966 | Mueller et al. | 260—666B |
| 3,271,468 | 9/1966 | Wilke et al. | 260—666B |
| 3,277,099 | 8/1966 | Seibt | 260—666B |
| 3,272,876 | 9/1966 | Levine | 260—666B |
| 3,379,706 | 4/1968 | Wilke | 260—943 |

DELBERT E. GANTZ, Primary Examiner

V. O'KEEFE, Assistant Examiner

U.S. Cl. X.R.

60—408; 260—668, 611

Kr.799.1

UNITED STATES PATENT OFFICE
CERTIFICATE OF CORRECTION

Patent No. 3,586,727      Dated June 22, 1971

Inventor(s) GÜNTHER WILKE and PAUL HEIMBACH

It is certified that error appears in the above-identified patent and that said Letters Patent are hereby corrected as shown below:

Column 1, line 50, "1,114,268" should be --1,444,268--; column 2, line 4, after "of" insert --a--; column 2, line 55, "Auslegeschift" should be --Auslegeschrift--; column 2, line 61, "Auslegeschift" should be --Auslegeschrift--; column 3, line 8, "cause" should be --use--; column 3, line 28, "cyclooligomerization" should be --cyclocooligomerization--; column 3, lines 49-50, "thereing" should be --therein--; column 7, line 24, "adsorbed" should be --absorbed--; column 7, line 38, "1,4609" should be --1.4609--; column 7, line 49, after "7.3%" insert --5--; column 10, line 3, "vinylcyclohexane" should be --vinylcyclohexene--

Signed and sealed this 30th day of November 1971.

(SEAL)
Attest:

EDWARD M. FLETCHER, JR.      ROBERT GOTTSCHALK
Attesting Officer      Acting Commissioner of Patents